(12) United States Patent
Trzmiel et al.

(10) Patent No.: US 6,910,465 B2
(45) Date of Patent: Jun. 28, 2005

(54) THROTTLE VALVE ESPECIALLY FOR HIGH-PRESSURE DIESEL PUMPS OF INJECTION DEVICES OF MOTOR VEHICLES

(75) Inventors: Alfred Trzmiel, Grafenberg (DE); Rolf Neuhaus, Lohr (DE); Friedrich Zapf, Karlstadt (DE)

(73) Assignee: Hydraulik-Ring GmbH, Nürtingen (DE)

( * ) Notice: Subject to any disclaimer, the term of this patent is extended or adjusted under 35 U.S.C. 154(b) by 50 days.

(21) Appl. No.: 10/249,426

(22) Filed: Apr. 8, 2003

(65) Prior Publication Data
US 2003/0221673 A1 Dec. 4, 2003

(30) Foreign Application Priority Data
Apr. 12, 2002 (DE) .......................... 102 16 153

(51) Int. Cl.[7] ............................................... F02M 37/04
(52) U.S. Cl. ......................................... 123/498; 123/502
(58) Field of Search ............................... 123/337, 498, 123/502

(56) References Cited

U.S. PATENT DOCUMENTS

| | | | |
|---|---|---|---|
| 4,610,427 A | 9/1986 | Igashira et al. | 251/129.08 |
| 4,838,233 A | 6/1989 | Hayashi et al. | 123/506 |
| 5,036,821 A * | 8/1991 | Horiuchi et al. | 123/498 |
| 5,057,734 A * | 10/1991 | Tsuzuki et al. | 123/498 |
| 6,082,332 A | 7/2000 | Hefler et al. | 123/446 |
| 6,240,905 B1 * | 6/2001 | Boecking | 123/498 |
| 2002/0000219 A1 * | 1/2002 | Augustin et al. | 123/502 |

FOREIGN PATENT DOCUMENTS

WO    WO 00/52322    9/2000

* cited by examiner

Primary Examiner—Erick Solis
(74) Attorney, Agent, or Firm—Gudrun E. Huckett

(57) ABSTRACT

A throttle valve for a high-pressure diesel pump of an injection device of a motor vehicle has at least one piston movable by a medium under pressure against a counter force and has at least one throttle location. A prestage valve in the form of a pressure control valve having a valve body is provided. The pressure control valve comprises a piezo drive. The piezo drive has at least one piezo element. A tappet is connected to the at least one piezo element. The tappet secures the valve body in a closing position. A bushing is provided in which the piston is slidably guided. The bushing has at least one annular groove into which at least one control bore opens.

20 Claims, 2 Drawing Sheets

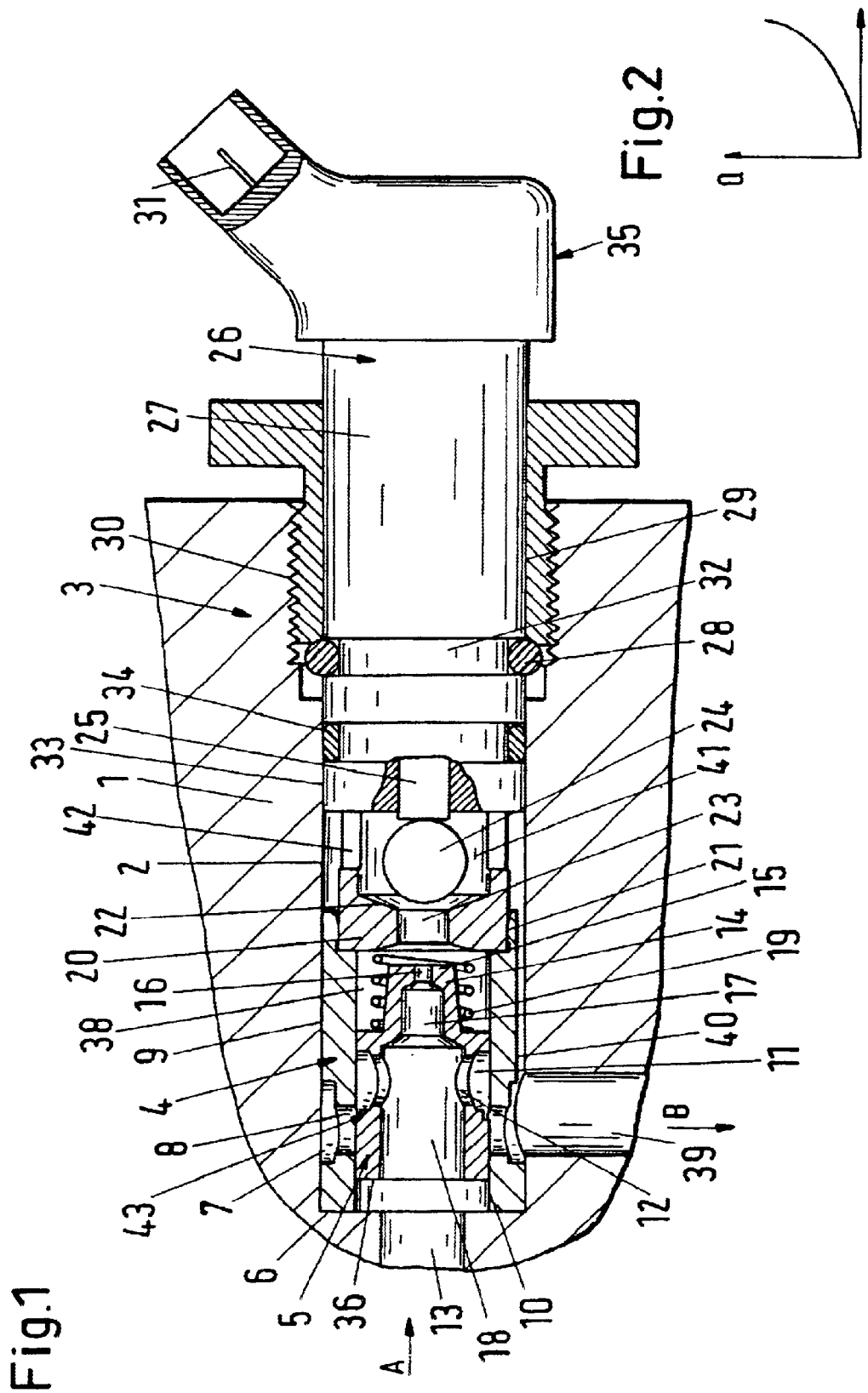

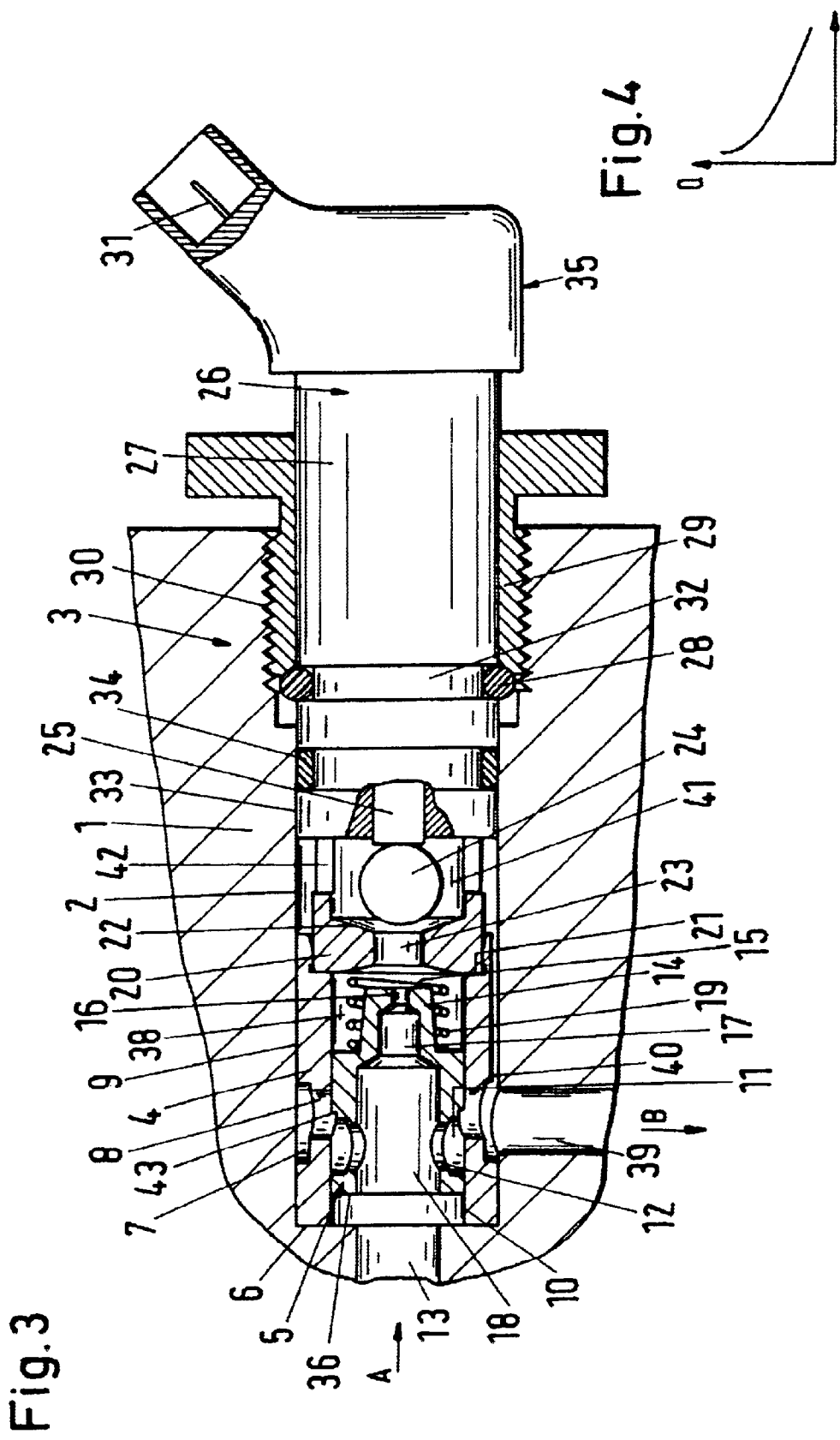

THROTTLE VALVE ESPECIALLY FOR HIGH-PRESSURE DIESEL PUMPS OF INJECTION DEVICES OF MOTOR VEHICLES

BACKGROUND OF THE INVENTION

1. Field of the Invention

The invention relates to a throttle valve, in particular, for high-pressure diesel pumps of injection devices of motor vehicles, comprising at least one piston movable by a medium under pressure against a counter force and comprising at least one throttle location.

2. Description of the Related Art

Throttle valves usually have a complex configuration and a large size.

SUMMARY OF THE INVENTION

It is an object of the present invention to configure a throttle valve of the aforementioned kind such that it has a simple configuration and is of a compact size while it can be manufactured inexpensively.

In accordance with the present invention, this is achieved in that a pressure control valve is correlated with the throttle valve as a prestage valve, wherein the pressure control valve has a piezo drive with at least one piezo element that is connected to a tappet securing a valve body in a closing position.

In the throttle valve according to the invention, the prestage (valve) is formed by a pressure control valve comprising a piezo drive with at least one piezo element. It is fixedly connected with a tappet that secures a valve body in a closing position. The piezo drive has a simple configuration, is comprised only of a few components, and can therefore be manufactured inexpensively. Also, the piezo drive can be controlled in a simple way.

BRIEF DESCRIPTION OF THE DRAWINGS

FIG. 1 is an axial section of a first embodiment of the throttle valve according to the invention.

FIG. 2 is a flow-current diagram of the throttle valve according to FIG. 1.

FIG. 3 shows in an illustration corresponding to FIG. 1 the second embodiment of the throttle valve according to the invention.

FIG. 4 is a flow-current diagram of the throttle valve according to FIG. 3.

DETAILED DESCRIPTION

The throttle valve according to FIG. 1 is preferably used for high-pressure diesel pumps of injection devices of motor vehicles. The high-pressure pump has a pump housing 1 which comprises a mounting chamber 2 for a throttle valve 3. A bushing 4 is inserted into the mounting chamber 2 and receives a piston 5. The bushing 4 rests against the bottom 6 of the mounting chamber 2 and has on its periphery an annular groove 7, wherein radial bores 8 penetrating the bushing 4 open into the annular groove 7. The bushing 4 is seated seal-tightly in the mounting chamber 2 and rests against its inner wall 9.

The piston 5 rests seal-tightly against the inner wall 10 of the bushing 4 and has at its outer side an annular groove 11 into which radial bores 12 open that are distributed about the circumference of the piston 5.

The piston 5 is a hollow piston which opens in the direction toward the bottom 6 of the mounting chamber 2. A hydraulic medium-conducting bore 13 provided in the pump housing 1 opens centrally at the bottom 6. The medium which is contained in the bore 13 can reach the interior of the hollow piston 5. The hollow piston 5 is provided with a central axial projection 14 at its end face facing away from the bottom 6 of the mounting chamber 2. This axial projection 14 is configured as a hollow truncated cone and has an end face 15 penetrated by an axial bore 16. The bore 16 has a cross-section that is significantly smaller than that of the interior 17 of the projection 14 and the hollow chamber 18 of the piston 5. The cross-section of the interior 17 of the projection 14 is also smaller than the cross-section of the hollow chamber 18.

The hollow piston 5 is loaded by at least one pressure spring 19 in the direction toward the bottom 6 of the mounting chamber 2. The spring 19 surrounds the projection 14 and is supported with one end on the hollow piston 5 and with its other end on the insert 20. The insert 20 rests on a radial shoulder surface 21 which is provided on the inner wall 10 of the bushing 4. The insert 20 has a valve seat 22 into which a bore 23 opens centrally. The bore 23 can be closed by a valve body 24 which is a valve ball in the illustrated embodiment. The bore 23 has a larger diameter than the bore 16 in the axial projection 17 of the piston; the bore 16 forms a throttle location. The valve body 24 is secured by a tappet 25 in a sealing position or closing position. The tappet 25 is actuated by a piezo drive 26. The tappet 25 is fixedly connected to the piezo elements (not illustrated) of the piezo drive 26.

The piezo drive 26 is of a known configuration and has a housing 27 which is sealed by at least one sealing ring 28 and is positioned in a nut 29 which is screwed into a widened section 30 of the mounting chamber 2. The piezo drive 26 is provided with a current/voltage connector 31 at its end projecting axially past the nut 29. The housing 27 of the piezo drive 26 has an annular groove 32 for receiving the sealing ring 28 and projects with its free end into the section 33 of the mounting chamber 2 which has a smaller diameter. The bushing 4 which receives the hollow piston 5 is also arranged in this section 33. Relative to the inner wall 9 of this mounting chamber section 33, the housing 27 is sealed off by an additional sealing ring 34 which is seated on the free end of the housing 27.

By supplying current to the piezo drive 26, the tappet 25 forces the valve body 24 against the valve seat 22 so that the bore 23 is closed. The force with which the tappet 25 forces the valve body 24 into its closing position can be variably adjusted by the current/voltage level. The piezo drive 26 with the tappet 25, the valve body 24, and the insert 20 form a pressure control valve 35 with which the pressure in the hollow chamber 38 can be adjusted proportionally to the current/voltage level.

The pressure control valve 35 is a proportional pressure control valve with which the pressure at which the pressure control valve opens can be continuously adjusted.

The medium under pressure which is supplied via the bore 13 acts on the annular end face 36 of the hollow piston 5 as well as onto the end face 37 of the projection 14 located within the hollow piston 5. When the pressure acting on the hollow piston 5 is greater than the counter pressure exerted by the pressure spring 19, the hollow piston 5 is moved against the force of the pressure spring 19 in the direction toward the insert 20. Via the throttle bore 16 the medium also reaches the pressure chamber 38 which is limited axially by the hollow piston 5 as well as the insert 20. The throttle bore 16 ensures that the pressure in the hollow chamber 38 is adjusted depending on the force acting on the valve body 24. The bore 23 in the insert 20 is closed by the valve body 24 so that the medium cannot flow from the pressure chamber 38 through the bore 23. When the projection 14 of the hollow piston 5 comes to rest against the insert 20, the radial bores 8 are closed so that the hydraulic medium cannot flow to the control bore 39 positioned transversely to the bore 13.

The surface area conditions on the hollow piston 5 in connection with the force exerted by the pressure spring 19 are adjusted relative to one another such that the hollow piston 5 assumes a position in which it provides a connection between the bore 13 and the bore 39. The hydraulic medium flows from the axial bore 13 into the hollow chamber 18 of the hollow piston 5. The hollow piston 5, as shown in FIG. 1, will reach such a position that the hydraulic medium can flow from the annular groove 11 via the radial bores 8 into the annular groove 7 of the bushing 4 and from there into the control bore 39.

The annular groove 7 is connected by at least one connection 40 with a pressure chamber 41 in which the valve body 24 is positioned and which is provided within the insert 20. The wall of the insert 20 is provided with through openings 42 which are advantageously uniformly distributed about the circumference of the insert 20. The connection 40 in the illustrated embodiment is an axial recess which is provided in the outer peripheral surface of the bushing 4. However, it can also be a recess in the inner wall 9 of the mounting chamber 2 or, for example, can be formed by an axial bore in the bushing 4 and/or in the housing 1.

In cross-section, the annular groove 11 of the hollow piston 5 is stepped such that it has in a radially outward direction its greatest cross-section and, by means of at least one step, passes into a section having a smaller cross-section.

When the pressure of the hydraulic medium supplied via the bore 13 is higher than the pressure adjusted by means of the pressure control valve 35, the hollow piston 5 is moved to the right in FIG. 1 such that it comes to rest with its projection 14 on the insert 20. In this position, the hollow piston closes the radial bores 8 of the bushing 4 so that the hydraulic medium cannot reach the bore 39 and thus also not the supply line 40. Via the throttle bore 16, which is provided centrally in the projection 14 of the hollow piston 5 and is positioned coaxially to the bore 23 in the insert 20, the excessive pressure of the hydraulic medium acts on the valve body 24.

As soon as the pressure of the hydraulic medium in the bore 13 surpasses the pressure exerted by means of the tappet 25 onto the valve body 24, the valve body 24 is lifted off the valve seat against the pressure exerted by the piezo drive 26 via the tappet 25 so that the hydraulic medium can flow via the throttle bore 16, the bore 23, the pressure chamber 41, and the supply line 40 into the bore 39. In this way, excessive pressure in the bore 13 is reliably relieved. As soon as the pressure of the medium in the bore 13 is again smaller than the counter pressure exerted by the tappet 25 on the valve body 24, the valve body 24 is again pushed back into its closed position in which it closes off the bore 23. The hollow piston 5 is then moved back, assisted by the pressure spring 19, into its connecting position in which it connects the bore 13 in the described way to the bore 39. In this way, the size of the connection between the bores 13 and 39 can be adjusted proportionally to the pressure in the hollow chamber 38 and thus relative to the current/voltage level.

The throttle valve 3 is preferably a proportional throttle valve. It is preferably used for high-pressure diesel pumps of injection devices of motor vehicles. The manufacture of the throttle valve 3 as well as of the control valve 35 requires only minimal costs. The piezo drive 26 of the pressure control valve 35 employs the piezo drive of the injection valves of the injection device. By employing the piezo drive 26, the number of components is reduced. Since the piezo drive 26 has only a minimal size, the pressure control valve 35 also has a correspondingly minimal size.

The piezo elements of the piezo drive 26 has a very short response time so that a high stability of the pressure control valve 26 results. The control of the piezo drive 26 is possible in an analog or digital way. Based on the use of the piezo drive 26, the hysteresis is zero because the tappet 25 is exposed to a force only on one side by means of the piezo elements. Since the piezo elements have a very short response time, the pressure control valve 35 has high dynamics. The pressure control valve 35 as well as the throttle valve 3 can be inserted preferably directly into the housing 1 of the pump. Since the piezo drive 26 can be screwed by means of a nut 29 into the housing 1, the piezo drive 26 can be exchanged or replaced, if needed.

For controlling the piezo drive 26, the electronic device of the injector control of the injection device can be used. Moreover, the same voltage as for the injector control can be employed for operating the piezo drive 26. The pressure control valve 35 has advantageously only a minimal weight as a results of its compact dimensions and its minimal number of components.

The throttle valve 3 in connection with the pressure control valve 35 arranged downstream ensures a problem-free operation of the entire device.

The embodiment according to FIG. 3 is substantially identical to the embodiment of FIG. 1. The pressure control valve 35 corresponds entirely to the preceding embodiment. In contrast to the preceding embodiment, the throttle valve 3 is configured such that the hollow piston 5 closes the control bore 39 when the piezo drive 26 is supplied with electric current. As soon as the piezo drive 26 is not supplied with current, the hollow piston 5 is adjusted such that the control bore 39 is open. In order to ensure this function, the annular groove 11 in the hollow piston 5 is arranged in a position rotated by 180 degrees in comparison to the preceding embodiment. The control edge 43 in the embodiment according to FIG. 3 is oriented in the direction toward the pressure control valve 35 while in the preceding embodiment it is oriented in the direction toward the bore 13. The annular groove 11 of the hollow piston 5 is positioned substantially to the left of the radial bores 8 of the bushing 4 while in the embodiment according to FIG. 1 it is provided substantially to the right of the radial bores 8.

In other respects, the throttle valve 3 is identical to the preceding embodiment.

As a result of the described configuration, the pump continues to operate when, for example, the current supply fails and, accordingly, the piezo drive 26 of the pressure control valve 35 is without electric current. In this case, in contrast to the preceding embodiment, the hollow piston 5 is not moved into its closed position in which it separates the bore 13 from the control bore 39 but is in the connecting position illustrated in an exemplary fashion in FIG. 3. For a current-less piezo drive 26, the hydraulic medium is supplied from the bore 13 into the control bore 39 via the radial bores 8, 12 of the bushing 4 and of the hollow piston 5.

FIG. 4 shows the flow-current diagram of the throttle valve 3 according to FIG. 3. The annular groove 11 of the hollow piston 5 is configured such that it has its greatest cross-section in the outer wall area of the hollow piston 5. This cross-section is reduced radially inwardly in a stepped fashion. In contrast to the embodiment of FIG. 1, the enlarged cross-sectional area of the annual groove 11 is provided such that it projects axially past the smaller cross-sectional area in the direction toward the pressure control valve 35. In this way, it is ensured that the pump can still be operated when no current is supplied, i.e., when the piezo drive 26 is not activated.

In both described embodiments, the valve body 24 can be secured and guided by a pin (not illustrated) in the insert 20. This pin can extend through the valve body 24. The valve body 24 is provided for this purpose with an elongate opening so that it can carry out the movements required for closing and opening the bore 23.

While specific embodiments of the invention have been shown and described in detail to illustrate the inventive principles, it will be understood that the invention may be embodied otherwise without departing from such principles.

What is claimed is:

1. A throttle valve for a high-pressure diesel pump of an injection device of a motor vehicle, the throttle valve comprising:
   at least one piston configured to be moved by a medium under pressure against a counter force and having at least one throttle location;
   a prestage valve in the form of a pressure control valve having a valve body;
   an insert having a bore and a valve seat provided at the bore, wherein the valve body is arranged in the insert and rests againts the valve seat in a closing position;
   the pressure control valve comprising a piezo drive;
   the piezo drive comprising at least one piezo element;
   a tappet connected to the at least one piece of element;
   wherein the tappet secures the valve body in a closing position;
   a pressure chamber located between the piston and the insert, wherein the at least one throttle location is arranged in front of the valve seat and opens into the pressure chamber.

2. The throttle valve according to claim 1, wherein the at least one piston is a hollow piston.

3. The throttle valve according to claim 1, further comprising a bushing , wherein the at least one piston is slidably guided in the bushing .

4. The throttle valve according to claim 3, wherein the bushing has at least one annular groove , wherein at least one control bore opens into the annular groove .

5. The throttle valve according to claim 3, wherein the at least one piston has a peripheral surface and at least one annular groove arranged in the peripheral surface.

6. The throttle valve according to claim 5, wherein the at least one annular groove of the at least one piston has a cross-section widening in a direction to an intake end of the piston .

7. The throttle valve according to claim 5, wherein the at least one annular groove of the at least one piston has a cross-section widening in a direction toward the pressure control valve .

8. The throttle valve according to claim 5, wherein the at least one piston has radial bores penetrating the at least one piston and opening into the at least one annular groove .

9. The throttle valve according to claim 4, wherein the bushing has radial bores penetrating the bushing and opening into the at least one annular groove of the bushing .

10. The throttle valve according to claim 1, wherein the at least one piston has a piston end facing the pressure control valve and wherein the at least one throttle location is provided on the end piston end.

11. The throttle valve according to claim 10, wherein the at least one piston has an axial projection and wherein the at least one throttle location is a bore provided in the axial projection .

12. The throttle valve according to claim 1, configured to be inserted into a housing of the diesel pump.

13. The throttle valve according to claim 1, further comprising
   a bushing, wherein the at least one piston is slidably guided in the bushing and the insert is inserted into the bushing.

14. The throttle valve according to claim 13, wherein the bushing has at least one annular groove , wherein at least one control bore opens into the annular groove , and wherein the insert has a receiving chamber for the valve body wherein the receiving chamber is connected to the control bore .

15. The throttle valve according to claim 15, configured to be inserted into a mounting chamber of a housing of the diesel pump, wherein at least one of the bushing and a wall of the mounting chamber has at least one flow channel connecting the receiving chamber of the insert with the control bore .

16. The throttle valve according to claim 16, further comprising a screw element configured to secure the piezo drive in the mounting chamber of the pump housing .

17. The throttle valve according to claim 17, wherein the screw element is a nut and the piezo drive is inserted into the nut.

18. The throttle valve according to claim 1, wherein the piezo drive is configured to be controlled by an injector control for controlling injection valves of the injection device.

19. The throttle valve according to claim 1, embodied as a proportional throttle valve.

20. The throttle valve according to claim 1, wherein the pressure control valve is a proportional pressure control valve.

* * * * *